(12) United States Patent
Park et al.

(10) Patent No.: US 10,507,763 B2
(45) Date of Patent: Dec. 17, 2019

(54) INDIRECT LIGHTING STRUCTURE FOR VEHICLE ROOF

(71) Applicants: Hyundai Motor Company, Seoul (KR); Kia Motors Corporation, Seoul (KR); Webasto Donghee Holdings, Ulsan (KR)

(72) Inventors: Hoo Sang Park, Gyeonggi-do (KR); Chang Min Park, Busan (KR)

(73) Assignees: Hyundai Motor Company, Seoul (KR); Kia Motors Corporation, Seoul (KR); Webasto Donghee Holdings, Ulsan (KR)

( * ) Notice: Subject to any disclaimer, the term of this patent is extended or adjusted under 35 U.S.C. 154(b) by 0 days.

(21) Appl. No.: 16/034,077

(22) Filed: Jul. 12, 2018

(65) Prior Publication Data

US 2019/0176693 A1    Jun. 13, 2019

(30) Foreign Application Priority Data

Dec. 11, 2017 (KR) .................. 10-2017-0168977

(51) Int. Cl.
| | |
|---|---|
| *B60Q 3/74* | (2017.01) |
| *B60Q 3/64* | (2017.01) |
| *B60Q 3/57* | (2017.01) |
| *B60Q 3/60* | (2017.01) |
| *B60J 7/043* | (2006.01) |

(52) U.S. Cl.
CPC .............. *B60Q 3/74* (2017.02); *B60Q 3/57* (2017.02); *B60Q 3/60* (2017.02); *B60Q 3/64* (2017.02); *B60J 7/043* (2013.01)

(58) Field of Classification Search
CPC ... B60Q 3/74; B60Q 3/60; B60Q 3/57; B60Q 3/64; B60J 7/043
See application file for complete search history.

(56) References Cited

U.S. PATENT DOCUMENTS

| | | | | |
|---|---|---|---|---|
| 4,584,631 | A * | 4/1986 | Cody ....................... | B60Q 3/74 362/302 |
| 7,284,886 | B2 * | 10/2007 | Chen ...................... | B62D 25/06 362/488 |
| 7,992,928 | B2 * | 8/2011 | Kimizuka .............. | B60J 7/0015 296/214 |
| 2013/0058115 | A1 * | 3/2013 | Pfeil ..................... | G02B 6/001 362/511 |

(Continued)

FOREIGN PATENT DOCUMENTS

| | | |
|---|---|---|
| KR | 20130136875 A | 12/2013 |
| WO | WO2015189178 | * 12/2015 |

*Primary Examiner* — Tracie Y Green
(74) *Attorney, Agent, or Firm* — Mintz Levin Cohn Ferris Glovsky and Popeo, P.C.; Peter F. Corless

(57) ABSTRACT

An indirect lighting structure for a vehicle roof provides indirect lighting to at least a part of a roof glass through a light guide formed along a guide rail. The indirect lighting structure includes: a guide rail configured to support a roof glass positioned on the guide rail; a light source unit positioned at one end in a longitudinal direction of the guide rail; and a light guide which is configured to be in contact with the light source unit and positioned along the guide rail, in which the light guide is configured such that at least a part of the light guide is in contact with and inserted into the guide rail so as to guide light introduced from the light source to illuminate a pattern portion.

9 Claims, 4 Drawing Sheets

(56) References Cited

U.S. PATENT DOCUMENTS

| | | | |
|---|---|---|---|
| 2013/0083559 A1* | 4/2013 | Oh | G02B 6/0088 |
| | | | 362/612 |
| 2015/0175064 A1* | 6/2015 | Albert | B60J 7/0015 |
| | | | 362/511 |
| 2015/0306944 A1* | 10/2015 | Kleinert | B60J 7/04 |
| | | | 296/211 |
| 2017/0158125 A1* | 6/2017 | Schuett | B60J 7/0007 |

\* cited by examiner

INDIRECT LIGHTING STRUCTURE FOR VEHICLE ROOF

CROSS-REFERENCE TO RELATED APPLICATION

This application claims under 35 U.S.C. § 119(a) the benefit of Korean Patent Application No. 10-2017-0168977 filed Dec. 11, 2017, the entire contents of which are incorporated herein by reference.

BACKGROUND

(a) Technical Field

The present disclosure relates to an indirect lighting structure for a vehicle roof, more particularly, to an indirect lighting structure for a vehicle roof that surrounds a roof through a light guide formed along a guide rail configured to be in contact with a roof glass.

(b) Description of the Related Art

Sunroofs are commonly mounted on vehicles in order to provide ventilation to an interior of a vehicle, e.g., while a vehicle occupant is smoking or during normal driving including long-distance trips, to compensate for a small space in the vehicle, and to ensure openness of the interior of the vehicle.

A sunroof typically includes a glass panel which is made of a glass material and mounted slidably to be able to open and close an opening formed in a roof panel of the vehicle, and the sunroof is configured to open and close the opening by tilting the glass panel or rectilinearly moving the glass panel forward and rearward.

Recently, a panoramic sunroof, which is mounted on the vehicle and has a roof panel entirely having a glass structure, has been preferred by customers.

The panoramic sunroof provides a driver and other vehicle occupants with a more pleasant ride quality while the vehicle travels during the day, since the panoramic sunroof improves openness in comparison with a typical sunroof, but there is a problem in that the effect of the sunroof is not great because an outside environment is not visible while the vehicle travels at night. In particular, the driver or other occupants may experience greater enjoyment while seeing falling rain or snow through the sunroof when it rains or snows, but the typical sunroof cannot provide this function at night.

In certain vehicles, lighting modules have been positioned at the periphery of the sunroof glass in order to provide ambient light, thereby imparting pleasant ride quality to the driver and/or other vehicle occupants even while the vehicle travels at night as well as while the vehicle travels during the day time.

FIG. 1 (PRIOR ART) illustrates a sunroof 1 positioned on a roof panel 2 of a vehicle, and illustrates multiple lighting modules 3 configured to surround the sunroof 1.

As shown, in the related art, the multiple lighting modules are installed along the sunroof of the vehicle and used to provide the ambient light at a user's request.

However, in the case of the lighting modules in the related art, there are problems in that the multiple lighting modules are required, a difference in luminous intensity occurs in accordance with a distance from a light source, and a loss of light occurs because the light source and a light guide are distant from each other.

The above information disclosed in this Background section is only for enhancement of understanding of the background of the disclosure and therefore it may contain information that does not form the prior art that is already known in this country to a person of ordinary skill in the art.

SUMMARY

The present disclosure provides an indirect lighting structure for a vehicle roof which causes no light scattering and may be assembled integrally with a guide rail.

The present disclosure also provides a configuration in which a light guide is fixed to a guide rail so as not to be exposed to the outside, thereby providing effects of preventing the exposure of the light source and improving an external appearance.

According to the present disclosure, an indirect lighting structure for a vehicle roof includes the following configurations.

In one aspect, the present disclosure provides an indirect lighting structure for a vehicle roof, the indirect lighting structure including: a guide rail configured to support a roof glass positioned on the guide rail; a light source unit positioned at one end in a longitudinal direction of the guide rail; and a light guide which is configured to be in contact with the light source unit and positioned along the guide rail, in which the light guide is configured such that at least a part of the light guide is in contact with and inserted into the guide rail so as to guide light introduced from the light source to illuminate a pattern portion.

In a preferred embodiment, the pattern portion may be positioned on at least one of the roof glass and a roll blind which is configured inside the vehicle along the roof glass.

In another preferred embodiment, the guide rail may further include a blocking portion which protrudes from a lower surface of the light guide toward an interior of the vehicle.

In still another preferred embodiment, a protruding end of the blocking portion may be positioned to be curved toward the roof glass at a predetermined angle.

In yet another preferred embodiment, the indirect lighting structure may further include a guide cover which is positioned on the guide rail in order to set a path of light emitted from the light guide.

In still yet another preferred embodiment, the indirect lighting structure may further include a reflective portion which is configured to face the light guide, in which light reflected by the reflective portion illuminates the pattern portion.

In a further preferred embodiment, the reflective portion may have a concave lens shape configured to face the light guide.

In another further preferred embodiment, the reflective portion may be positioned on the guide rail.

In still another further preferred embodiment, the light, which illuminates the pattern portion through the light guide, may have an illumination angle of 20° to 60°.

In yet another further preferred embodiment, the pattern portion may be configured within a predetermined region from an inner end of the guide rail.

The present disclosure may obtain the following effects through combinations of the aforementioned present exemplary embodiments and configurations to be described below, and a use relationship.

According to the present disclosure, the guide rail is configured to prevent the exposure of the light guide, thereby providing an effect of improving an external appearance of indirect lighting.

According to the present disclosure, the light, which is emitted from the light source via the light guide, directly illuminates the pattern portion, thereby providing an effect of preventing a loss of light even at a position distant from the light source.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
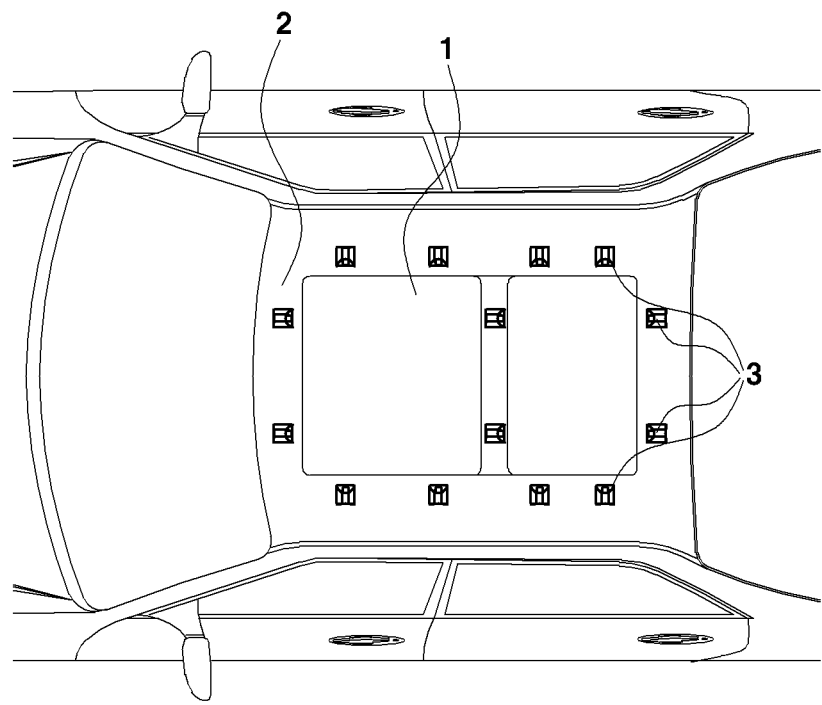
FIG. 1 (PRIOR ART) illustrates an indirect lighting structure for a vehicle roof in the related art which includes multiple light sources.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, exemplary embodiments of the present disclosure will be described in more detail with reference to the accompanying drawings. The exemplary embodiments of the present disclosure may be modified in various forms, and the scope of the present disclosure should not be interpreted as being limited to the following exemplary embodiments. The present exemplary embodiments are provided for more completely explaining the present disclosure to the person with ordinary skill in the art.

Figure 2:
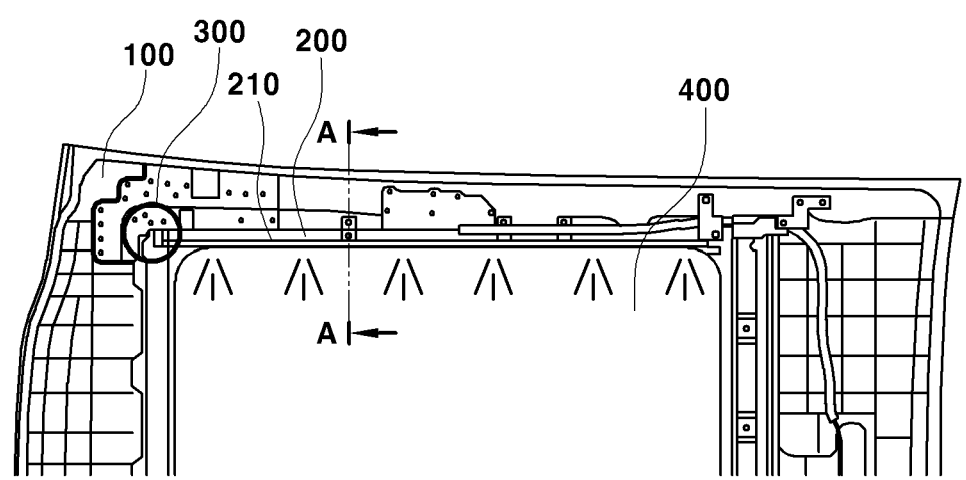
FIG. 2 is a front view of an indirect lighting structure for a vehicle roof according to an exemplary embodiment of the present disclosure.

FIG. 2 illustrates a front view of an indirect lighting structure for a vehicle roof according to an exemplary embodiment of the present disclosure.

As illustrated, there is provided a roof panel 100 including an opening at which a roof glass 400 of a vehicle is positioned, and the roof glass 400 is positioned on a guide rail 200.

A light source unit 300 is fastened to one end of the roof glass 400, and a light guide 210, which is coupled to be in contact with the light source, is formed along the guide rail 200. The light source unit 300 is fastened to a control unit of the vehicle through a connector and is supplied with electric power based on a user's request or setting.

At least one end of the light guide 210, which is in contact with and faces the guide rail 200, may be inserted into the guide rail 200, and the light guide 210 is configured to maintain constant luminous intensity along the guide rail 200 when the light is emitted from the light source.

The light, which is emitted from the light guide 210, illuminates the roof glass 400 or a roll blind 500 of the vehicle. In particular, the light illuminates a pattern portion 240 positioned on the roof glass 400 or a pattern portion 240 positioned on the roll blind 500.

One end of the light guide 210 and one end of the guide rail 200, which are in contact with each other, each have a cross section having a rectilinear shape, such that the light, which is emitted from the light guide 210 in a direction toward the pattern portion 240, is reflected by the rectilinear cross sections.

Figure 3:
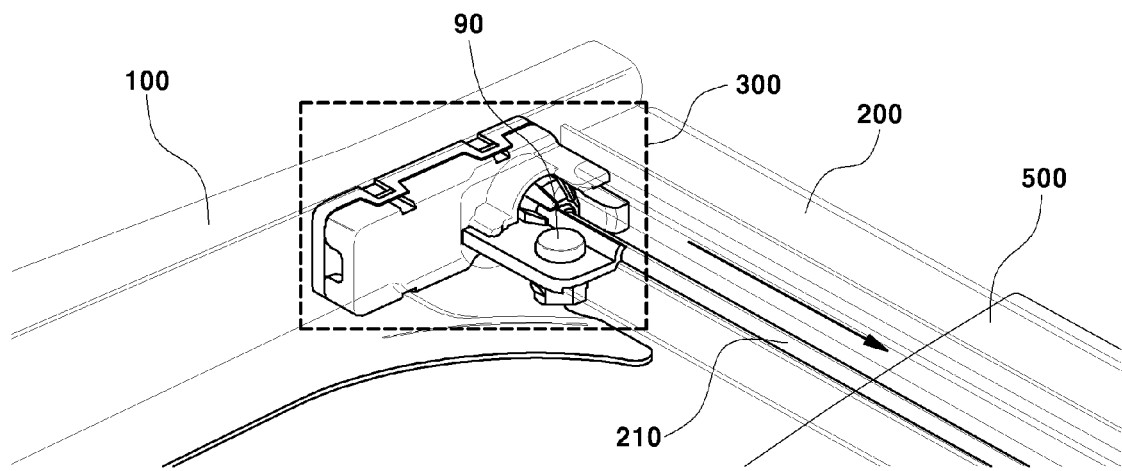
FIG. 3 illustrates positions of light sources of the indirect lighting structure for a vehicle roof according to the exemplary embodiment of the present disclosure.

FIG. 3 illustrates a configuration of the light source unit 300 fastened to the roof panel 100 according to the exemplary embodiment of the present disclosure.

The light source unit 300 includes a cover unit which is positioned to surround the light source, and a fixing clip which is configured to fix the light guide 210 and the cover unit.

The light source, which is configured to emit light by the control unit, may include a light emitting diode (LED), and the light guide 210 and the LED may be in contact with each other in order to minimize a loss of light.

The light source unit 300 is configured to be fixed to the roof panel 100 of the vehicle, and according to the exemplary embodiment of the present disclosure, the light source unit 300 is fastened to the roof panel 100 by bolting. However, the light source unit 300 may be fixed to the roof panel 100 by any suitable fastening member such as a type commonly used by those skilled in the art.

Figure 4:
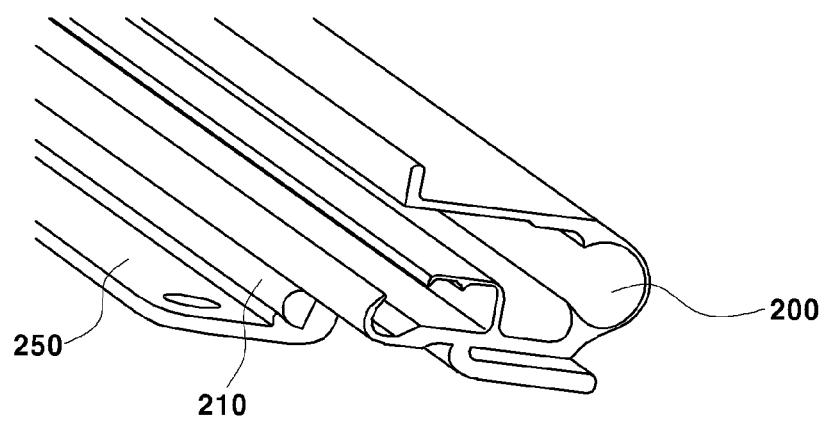
FIG. 4 illustrates a coupled view of a guide rail and a light guide of the indirect lighting structure for a vehicle roof according to the exemplary embodiment of the present disclosure.

FIG. 4 illustrates a configuration of the guide rail 200 configured to include the light guide 210 according to the exemplary embodiment of the present disclosure.

The guide rail 200 is configured to support the roof glass 400 and symmetrical about the vertical axis in a longitudinal direction of the vehicle. Further, there is provided the light guide 210 positioned on at least a part along the guide rail 200, and the light guide 210 is configured such that at least a part of the light guide 210 is inserted into a vehicle inner surface of the guide rail 200.

The light guide 210 may have a circular cross section. In particular, one end of the light guide 210, which faces the guide rail 200, may have a rectilinear shape so as to be in contact with the guide rail 200.

The guide rail 200 may be integrally formed and configured such that the light guide 210 is inserted into the guide rail 200, or the guide rail 200 may have a guide cover 220 and a rail which are separately formed and coupled to each other.

According to the exemplary embodiment of the present disclosure, the guide cover 220 may set an illumination angle of the light guide 210, and more particularly, the light guide 210 may be configured to allow the light to illuminate the pattern portion 240 at an illumination angle of 20° to 60°.

The guide rail 200 to which the light guide 210 is fastened or the guide cover 220 of the guide rail 200 may be configured to set a direction of light emitted from the light guide 210.

The light guide 210 and the guide cover 220 each have a rectilinear cross-sectional shape and are configured to be in contact with each other, and the light guide 210 and the guide cover 220 are configured such that the light emitted from the light guide 210 is reflected by the rectilinear cross-sectional shape and directed toward the interior of the vehicle.

As shown, the light guide 210 is positioned at one end of the vehicle inner surface of the guide rail 200, and the light guide 210 includes a blocking portion 250 which protrudes to the vehicle inner surface at a lower side of the light guide 210.

The blocking portion 250 is configured at a lower end of the guide rail 200 where the light guide 210 is at least positioned, and the blocking portion 250 serves to prevent the light guide 210 from being exposed to a visual field of a driver and an occupant.

In particular, one end of the blocking portion 250 is curved at a predetermined angle in a direction toward the roof glass 400 or has a predetermined curvature, thereby preventing the exposure of the light guide 210.

The blocking portion 250 positioned at one end of the guide rail 200 may include a reflective portion 230 configured to reflect light emitted from the light guide 210. According to the exemplary embodiment of the present disclosure, the light guide 210 emits light toward the reflective portion 230 positioned on an inner surface of the blocking portion 250, and the emitted light is reflected by the reflective portion 230 and distributed to the roof glass 400 or the roll blind 500.

Figure 5:
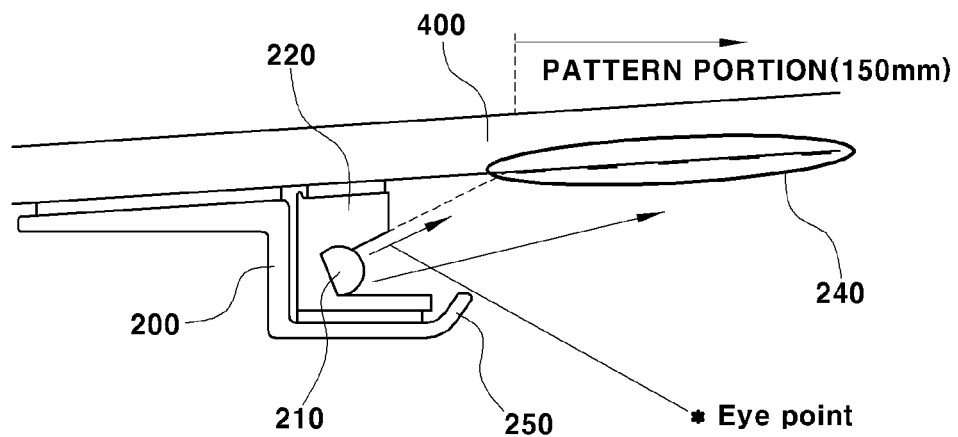
FIG. 5 illustrates a cross-sectional view of the indirect lighting structure for a vehicle roof according to the exemplary embodiment of the present disclosure.

FIG. 5 illustrates a configuration according to the exemplary embodiment of the present disclosure in which the light guide 210 emits light directly toward the roof glass 400.

As illustrated, the present disclosure includes the guide rail 200 and the light guide 210 inserted into the guide rail 200 in order to emit light toward the pattern portion 240 positioned on the roof glass 400.

In the illustrated exemplary embodiment, the light guide 210 is configured to emit light directly toward the pattern portion 240 positioned on the roof glass 400 or the roll blind 500, and the light, which illuminates the pattern portion 240 through the light guide 210, may have an illumination angle of 20° to 60°.

According to the exemplary embodiment of the present disclosure, the light guide 210 may include a rectilinear joint surface inserted into the guide rail 200, and the guide rail 200 may include the rail and the guide cover 220.

Shock absorbing materials may be positioned at positions where the guide rail 200 and the roof glass 400 face each other, and shock absorbing materials for absorbing impact may be further provided between the guide cover 220 and the rail and between the guide cover 220 and the roof glass 400.

The blocking portion 250, which is curved at a predetermined angle in the direction toward the roof glass 400, is provided at one end of the guide rail 200 inside the vehicle, and the blocking portion 250 is configured to prevent the light guide 210 from being exposed to the visual field of the driver or the occupant seated in the interior of the vehicle.

The light emitted from the light guide 210 configured as described above illuminates the pattern portion 240 positioned on the inner surface of the roof glass 400, thereby providing indirect lighting onto the roof glass 400.

The pattern portion 240 according to the present disclosure may be configured within a predetermined region based on an inner end of the guide rail 200. More particularly, the pattern portion 240 may be positioned in a section spaced 150 mm apart from an outermost periphery of the light emitted from the light guide 210.

Figure 6:
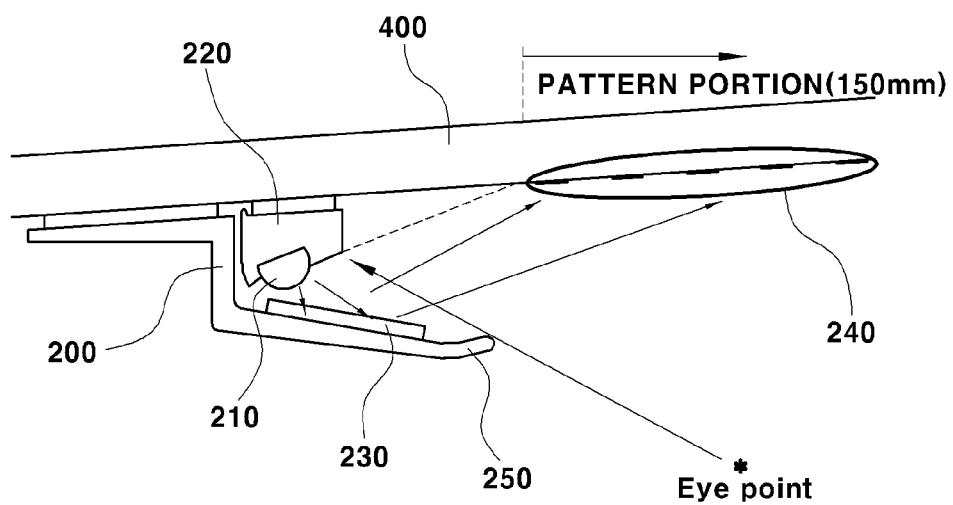
FIG. 6 is a cross-sectional view of an indirect lighting structure for a vehicle roof according to another exemplary embodiment of the present disclosure.

FIG. 6 illustrates a configuration according to another exemplary embodiment of the present disclosure in which the light guide 210 emits light through the reflective portion 230 positioned on the inner surface of the guide rail 200.

As shown, the indirect lighting structure for a vehicle roof includes the guide rail 200, and the roof glass 400 is positioned on the guide rail 200. In addition, at least one end of the light guide 210 is inserted into the guide cover 220 positioned on the guide rail 200.

In the illustrated exemplary embodiment, the light guide 210 is configured to emit light toward the blocking portion 250 of the guide rail 200, and the light guide 210 includes the reflective portion 230 positioned on the inner surface of the blocking portion 250 which faces the light guide 210.

The reflective portion 230 configured as described above is configured to reflect the light emitted from the light guide 210, and the reflected light illuminates the pattern portion 240 positioned on the roof glass 400 or the roll blind 500.

More particularly, one end of the vehicle inner surface of the blocking portion 250, which includes the reflective portion 230, may be curved at a predetermined angle in the direction toward the roof glass 400.

In still another exemplary embodiment, the blocking portion 250 positioned at the end of the guide rail 200 may have a predetermined curvature, and the blocking portion 250 is configured to prevent the light guide 210 from being exposed to the visual field of the occupant in the vehicle.

Similar to the configuration illustrated in FIG. 5, the shock absorbing materials may be further provided at the positions where the guide rail 200, the guide cover, and the roof glass 400 face one another, and the shock absorbing material may be made of a PU material.

Figure 7:
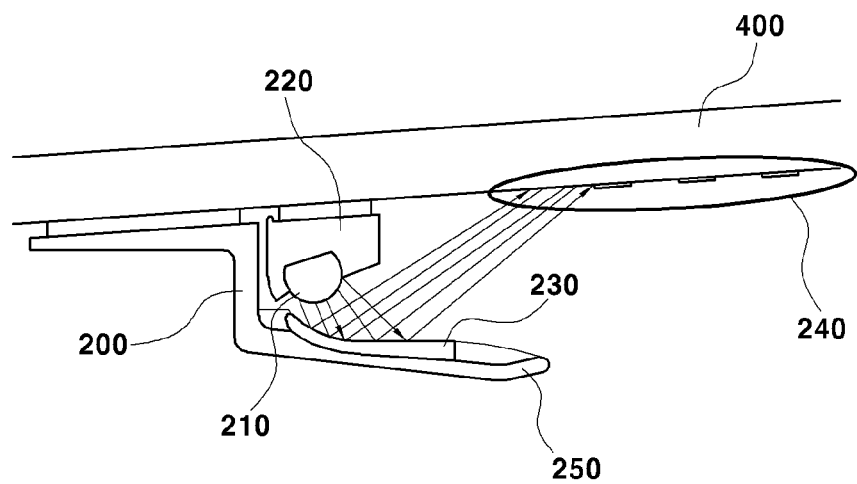
FIG. 7 is a cross-sectional view of an indirect lighting structure for a vehicle roof according to still another exemplary embodiment of the present disclosure.

FIG. 7 illustrates still another exemplary embodiment of the present disclosure, which includes all of the constituent elements identical to the constituent elements of the exemplary embodiment illustrated in FIG. 6.

However, in the present exemplary embodiment, the reflective portion 230, which faces the light guide 210, is configured to have a concave lens shape so as to correspond to the blocking portion 250 positioned on the guide rail 200.

That is, according to the exemplary embodiment of the present disclosure in which the reflective portion 230 is configured to have the concave lens shape, the light emitted from the light guide 210 illuminates a relatively small region of the roof glass 400 or the roll blind 500, such that an illumination region having higher luminous intensity is formed.

As shown, the present disclosure includes the light guide 210 configured such that at least a part of the light guide 210 is inserted into the guide cover 220 of the guide rail 200, and one end of the light guide 210 and one end of the guide cover 220, which are in contact with each other, each have a rectilinear cross section, such that the light, which is emitted from the light guide 210 in the direction toward the guide cover 220, is reflected by the rectilinear cross sections and directed toward the vehicle inner surface.

The light emitted from the light guide 210 is reflected by the reflective portion 230 having the concave lens shape and illuminates the pattern portion 240 having a relatively small region.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. An indirect lighting structure for a vehicle roof, the indirect lighting structure comprising:
   a guide rail configured to support a roof glass positioned on the guide rail;
   a light source unit positioned at one end in a longitudinal direction of the guide rail;
   a light guide which is configured to be in contact with the light source unit and positioned along the guide rail; and
   a reflective portion which is configured to face the light guide,
   wherein the light guide is arranged such that at least a part of the light guide is in contact with and inserted into the guide rail so as to guide light introduced from the light source to illuminate a pattern portion, and
   wherein light reflected by the reflective portion illuminates the pattern portion.

2. The indirect lighting structure of claim 1, wherein the pattern portion is positioned on at least one of the roof glass and a roll blind which is configured inside the vehicle along the roof glass.

3. The indirect lighting structure of claim 1, wherein the guide rail further includes a blocking portion which protrudes from a lower surface of the light guide toward an interior of the vehicle.

4. The indirect lighting structure of claim 3, wherein a protruding end of the blocking portion is positioned to be curved toward the roof glass at a predetermined angle.

5. The indirect lighting structure of claim 1, further comprising:
   a guide cover which is positioned on the guide rail in order to set a path of light emitted from the light guide.

6. The indirect lighting structure of claim 1, wherein the reflective portion has a concave lens shape configured to face the light guide.

7. The indirect lighting structure of claim 1, wherein the reflective portion is positioned on the guide rail.

8. The indirect lighting structure of claim 1, wherein the light, which illuminates the pattern portion through the light guide, has an illumination angle of 20° to 60°.

9. The indirect lighting structure of claim 1, wherein the pattern portion is configured within a predetermined region from an inner end of the guide rail.

* * * * *